United States Patent [19]
Jaggar

[11] Patent Number: 5,961,633
[45] Date of Patent: *Oct. 5, 1999

[54] EXECUTION OF DATA PROCESSING INSTRUCTIONS

[75] Inventor: David Vivian Jaggar, Cherry Hinton, United Kingdom

[73] Assignee: ARM Limited, Cambridge, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/619,647

[22] PCT Filed: Aug. 16, 1994

[86] PCT No.: PCT/GB94/01793

§ 371 Date: Mar. 22, 1996

§ 102(e) Date: Mar. 22, 1996

[87] PCT Pub. No.: WO95/08801

PCT Pub. Date: Mar. 30, 1995

[30] Foreign Application Priority Data

Sep. 23, 1993 [GB] United Kingdom .................. 9319662

[51] Int. Cl.⁶ ..................................................... G06F 9/00
[52] U.S. Cl. ........................................... 712/216; 712/200
[58] Field of Search .................................. 395/375, 392, 395/73, 376; 712/200, 216

[56] References Cited

U.S. PATENT DOCUMENTS 3,766,527 10/1973 Briley ................................. 340/172.5
4,385,365 5/1983 Hashimoto et al. ................ 364/900
5,202,967 4/1993 Matsuzaki et al. ................. 395/375

FOREIGN PATENT DOCUMENTS 1 480 209 7/1977 United Kingdom .............. G06F 9/00

OTHER PUBLICATIONS

Mike Muller, "ARM6 a High Performance Low Power Consumption Macrocell", Compcon Spring '93, San Francisco, California, Feb. 1993, pp. 80–87.
Stephen B. Furber, "VLSI RISC Architecture and Organization", 1989, pp. 229–230.
L. C. Garcia, D. C. Tjon and S. G. Tucker, "Storage Access–Exception Detection for Pipelined Execution Units", IBM Technical Disclosure Bulletin, vol. 25, No. 12, May 1983, pp. 6711–6712.
W. C. Brantley and J. Weiss, "Exception Handling in a Highly Overlapped Machine", IBM Technical Disclosure Bulletin, vol. 27, No. 5, Oct. 1984, pp. 2757–2759.

*Primary Examiner*—Zarni Maung
*Assistant Examiner*—Saleh Najjar
*Attorney, Agent, or Firm*—Fenwick & West LLP

[57] ABSTRACT

Data processing apparatus in which successive data processing instructions are executed comprises: memory accessing means for accessing a data memory in response to one or more of the instructions, the memory accessing means comprising means for detecting whether each memory access is invalid; condition test means, responsive to a processing state of the apparatus generated by previously executed instructions and operable during execution of each instruction, for detecting whether that instruction should be executed; and conditional control means, responsive to the memory accessing means and to the condition test means, for preventing complete execution of a current instruction if either the memory accessing means detects that a memory access initiated by the preceding instruction is invalid or the condition test means detects that the current instruction should not be executed.

12 Claims, 4 Drawing Sheets

EXECUTION OF DATA PROCESSING INSTRUCTIONS

BACKGROUND OF THE INVENTION

1. Field of the Invention

This invention relates to the execution of data processing instructions.

2. Description of the Prior Art

Some data processors comprise a central processor unit (CPU) which is able, under the control of a currently executed data processing instruction, to access data stored in a random access memory (RAM) via an intermediate memory management unit. A previously proposed example of such a data processor is the ARM6 processor, described in the "ARM6 Data Sheet" published by Advanced Risc Machines Limited, 1993.

During a memory access, the memory management unit may generate an abort signal indicating that the current memory access cannot be completed. Abort signals may be generated for a number of reasons. In one example, an aborted memory access can occur in a data processing system employing virtual memory in which data are swapped between a RAM and slower disk storage to give the illusion that the addressable memory space is greater than the amount of RAM provided. In such a system, if data corresponding to a required virtual address are currently held in the disk storage rather than the RAM, there will be a delay before those data are accessible, during which delay the data have to be transferred from the disk storage into the RAM. In this case, the current memory access is aborted, and an attempt is made later to access those data.

The abort signal supplied from the memory management unit is generated too late to stop execution of the instruction which initiated the failed memory access, but can instead be used to cancel execution of the following data processing instruction, i.e. the data processing instruction after the one which initiated the failed memory access. This is useful because subsequent instructions may rely on the memory access having been successful.

The use of the abort signal to cancel execution of the instruction immediately following the instruction which initiated the failed memory access places stringent requirements on the timing of the abort signal. Alternatively, a complex mechanism must be provided to 'undo' the results of the execution of the immediately following instruction, after execution of that instruction has been completed.

FIG. 1 of the accompanying drawings is a schematic timing diagram illustrating the timing requirements of the abort signal during a data write operation (in which data are written to RAM) by the previously proposed data processor referred to above.

Referring to FIG. 1, a clock signal 10 controls the execution of data processing instructions by the data processor. When a data write operation is initiated, a memory address 20 is supplied by the data processor to a memory management unit, and one half-cycle of the clock signal later, the data 30 to be written to that address are output by the data processor.

If the memory management unit detects that the memory address 20 is invalid (for example, because data corresponding to that address are currently held in disk storage in a virtual memory system), an abort signal 40 is generated by the memory management unit and supplied to the data processor.

The next instruction after a data write instruction is executed straight away, since there is no need (under normal circumstances) to await a response from the memory management unit after the data to be written have been placed on the data bus. Accordingly, in order for the abort signal to arrive in time to cancel execution of the immediately following instruction, the previously proposed data processor referred to above requires the abort signal to be valid one half-cycle of the clock signal before the data to be written are output by the data processor.

In practice, this timing constraint is difficult to achieve, and requires particularly fast operation of the memory management unit (with a correspondingly high power consumption by that unit).

The previously proposed data processor referred to above also provides conditional execution of its entire instruction set. This is achieved by comparing the current state of up to four processing flags with respective states defined by a condition code included in each instruction. This comparison takes place concurrently with execution of the instruction. Complete execution of an instruction is then prevented if the state of the processing flags does not match that specified by the condition code.

Another document describing this type of data processor is the article "ARM 6: A High Performance Low Power Consumption Macrocell", M. Muller, COMPCON Spring 93, pages 80–87. This describes the memory abort and conditional instruction execution features of the ARM 6 processor referred to above.

SUMMARY OF THE INVENTION

This invention provides a data processing apparatus in which successive data processing instructions are executed in a pipelined manner, the apparatus comprising: memory accessing means for accessing a data memory in response to one or more of the instructions, the memory accessing means comprising means for detecting whether each memory access is invalid; and condition test means, responsive to a processing state of the apparatus generated by previously executed instructions and operable during execution of each instruction, for detecting whether that instruction should be executed; characterised by conditional control means, responsive to the memory accessing means and to the condition test means, for preventing complete execution of a current instruction if either the memory accessing means detects that a memory access initiated by the preceding instruction is invalid or the condition test means detects that the current instruction should not be executed.

In a data processing apparatus according to the invention, a fully conditional instruction set is employed, and the mechanism for conditionally preventing complete execution of each instruction is also used to handle memory aborts. Thus, memory abort signals relating to a memory access initiated by the preceding instruction can be received at the same time, during execution of each instruction, as the detection by the condition test means of whether that instruction should be executed. This can allow memory aborts to be processed at a later time for each instruction than that allowed for the previously proposed data processor described above.

In a preferred embodiment, the apparatus comprises one or more processing flags for storing data indicative of a current processing state of the data processing apparatus; each instruction includes a condition code defining a state of the processing flags required for that instruction to be executed; and the condition test means is operable to compare the required state of the processing flags defined by the condition code in each instruction with the actual state of the processing flags. The condition codes may specify that a particular processing flags should be set to a particular logical state, or that the state of that processing flag has no influence on whether the current instruction should be executed. In an extreme case, a possible condition code may specify that a particular instruction should be executed regardless of the state of any of the processing flags.

The processing flags could specify various features of the processing state of the apparatus. In a preferred embodiment the apparatus comprises four processing flags respectively denoting:

(i) whether a previous data processing operation of the apparatus generated a negative result;

(ii) whether a previous data processing operation of the apparatus generated a zero result;

(iii) whether a carry bit was set by a previous data processing operation of the apparatus; and (iv) whether an arithmetic overflow occurred during a previous data processing operation of the apparatus.

Preferably the memory accessing means comprises: means for transmitting a memory address to the data memory; and means for subsequently transmitting data to the data memory or receiving data from the data memory.

In order that the conditional control means can conveniently be made responsive to both the memory accessing means and to the condition test means, it is preferred that: the memory accessing means is operable to generate an abort control signal to indicate that a memory access is invalid; the condition test means is operable to generate a condition failure control signal to indicate that the current instruction should not be executed; and the apparatus comprises means for combining the abort control signal and the condition failure control signal to generate a combined control signal for supply to the condition control means.

In an advantageously simple embodiment, the means for combining comprises a logical OR gate.

In a convenient embodiment, data processing operations of the apparatus are controlled by a clock signal.

Viewed from a second aspect this invention provides an integrated circuit comprising apparatus as defined above.

Viewed from a third aspect this invention provides a method of data processing in which successive data processing instructions are executed in a pipelined manner, the method comprising the steps of: accessing a data memory in response to one or more of the instructions; detecting whether each memory access is invalid; and detecting, during execution of each instruction, whether that instruction should be executed, in dependence on a processing state of the apparatus generated by previously executed instructions; characterised by the step of: preventing complete execution of a current instruction if it is detected either that a memory access initiated by the preceding instruction is invalid or that the current instruction should not be executed.

BRIEF DESCRIPTION OF THE DRAWINGS

The invention will now be described by way of example with reference to the accompanying drawings, throughout which like parts are referred to by like references, and in which.

DESCRIPTION OF THE PREFERRED EMBODIMENTS

Figure 1:
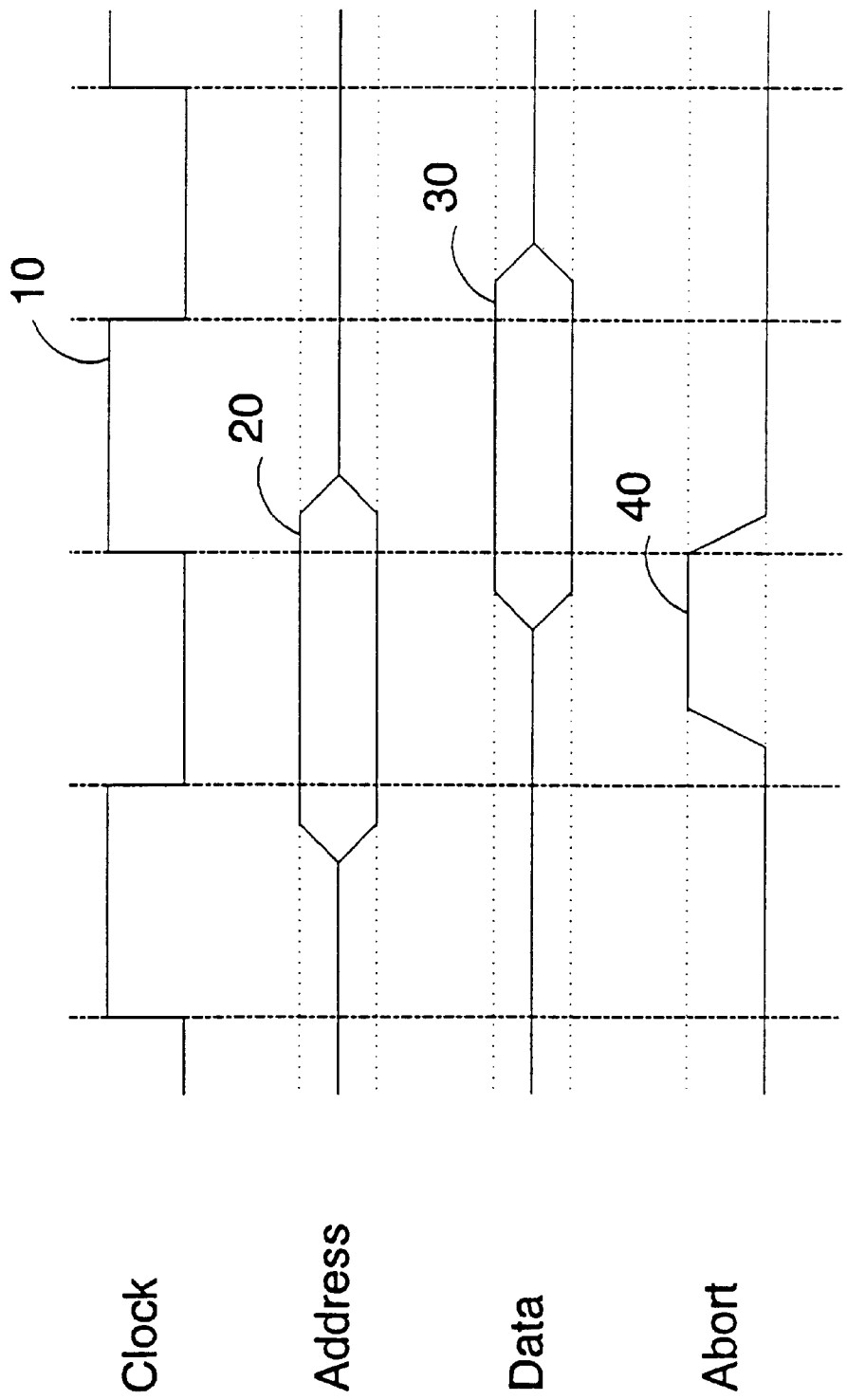
FIG. 1 is a schematic timing diagram illustrating the timing requirements of an abort signal during a data write operation by a previously proposed data processor.
Figure 2:
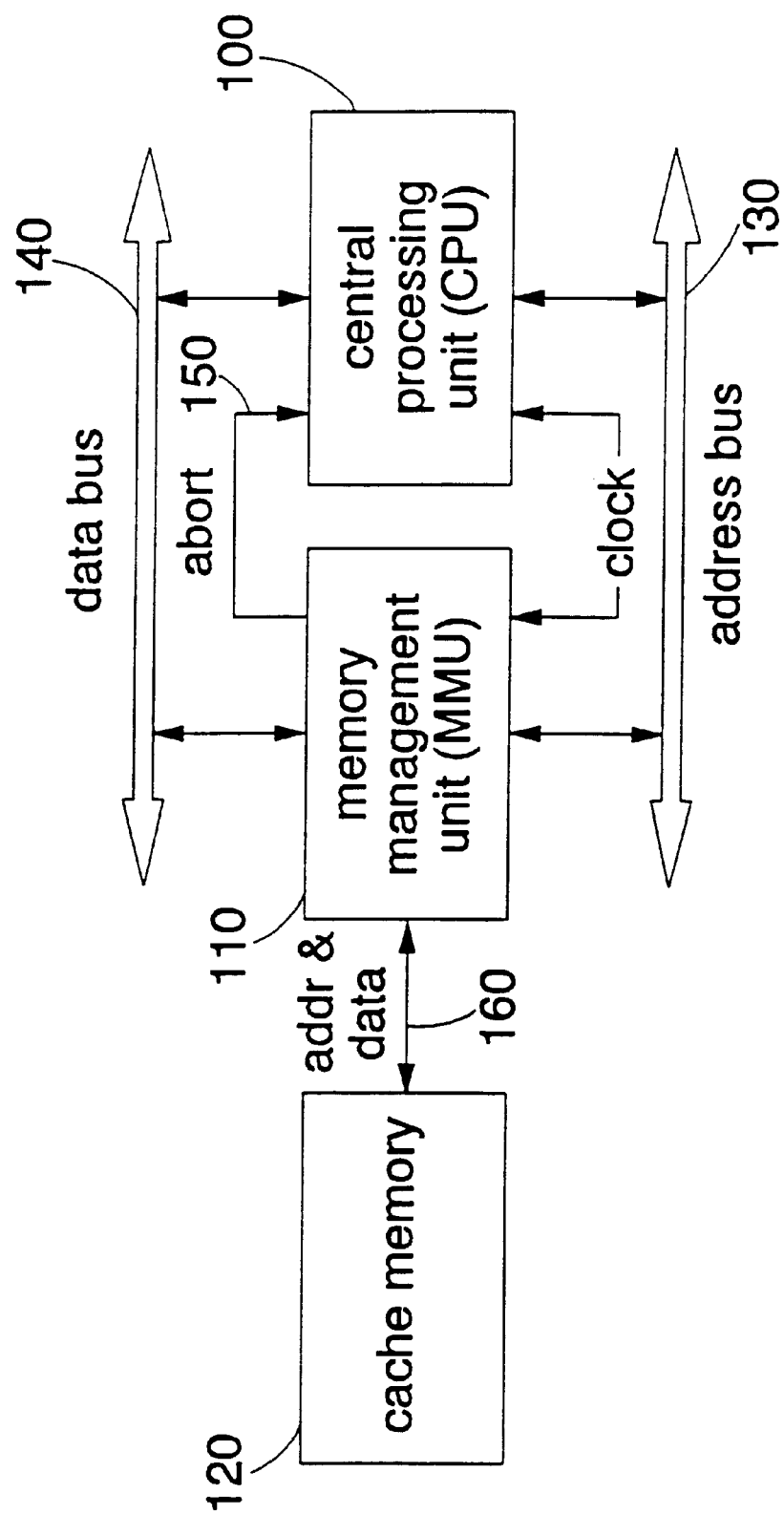
FIG. 2 is a schematic block diagram of a data processing apparatus according to an embodiment of the invention.

Referring now to FIG. 2, a schematic block diagram of a data processing apparatus according to an embodiment of the invention is illustrated. The apparatus comprises a central processing unit (CPU) 100, a memory management unit (MMU) 110 and a random access memory (RAM) 120. The CPU 100 and the MMU 110 are linked by an address bus 130 for the exchange of memory addresses and a data bus 140 for the exchange of data. An abort control line 150 is also provided from the MMU 110 to the CPU 100 to carry an abort signal indicative of a failed or invalid memory access.

A clock signal is supplied to the CPU 100 and to the MMU 110 to control the operations of both of these units. Each data processing instruction is executed by the CPU 100 in a particular number of cycles of the clock signal (depending on the nature of that instruction) and memory access by the MMU 110 is performed in synchronism with the clock signal.

The MMU 110 operates under the control of the CPU 100 and the clock signal to access data stored in the RAM 120. Accordingly, the MMU is linked to the RAM by a plurality of address and data lines 160.

Figure 3:
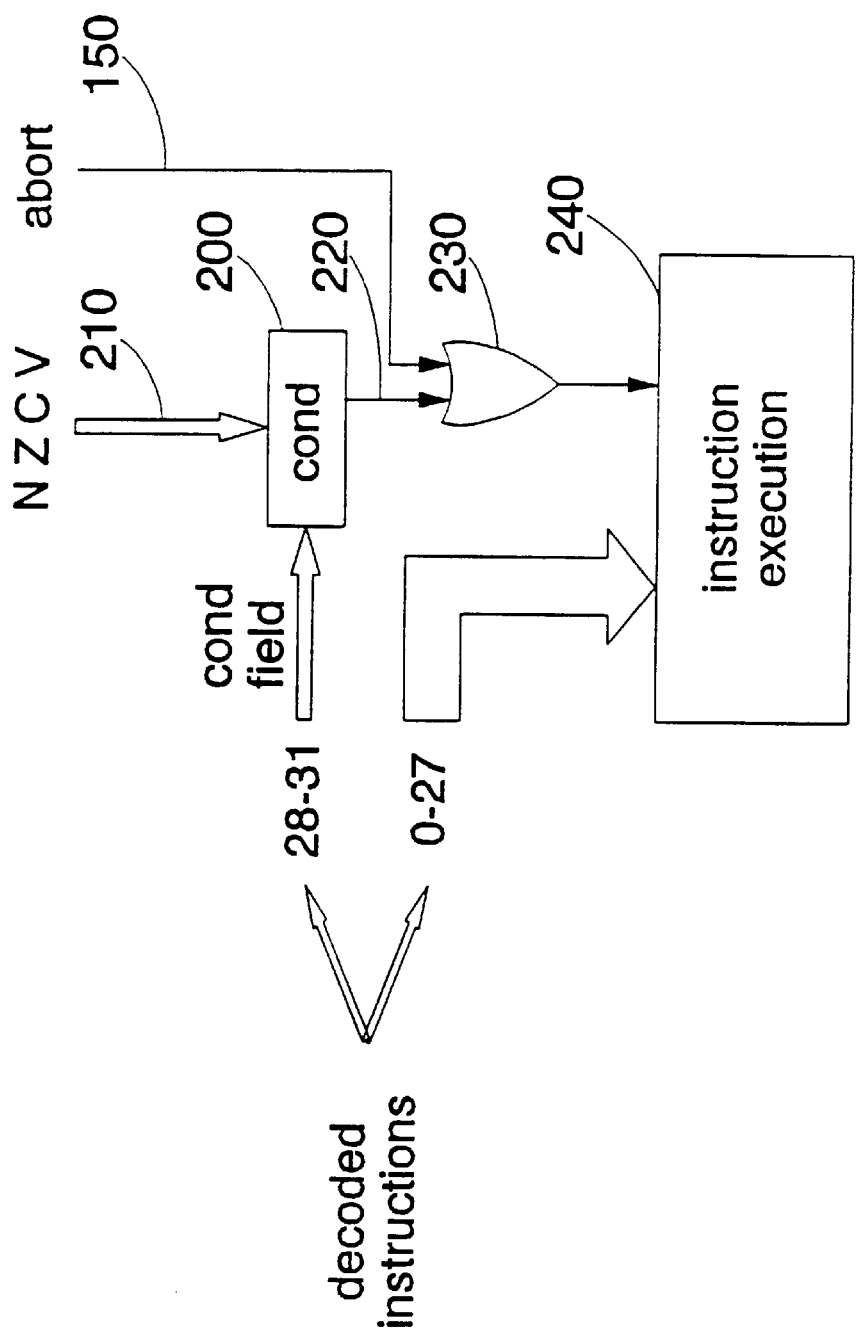
FIG. 3 is a schematic block diagram of a part of a central processing unit.

FIG. 3 is a schematic block diagram of a part of the central processing unit 100. The CPU 100 employs instruction pipelining, to allow the processing and memory operations to be performed substantially continuously. Typically, while one data processing instruction is being executed, its successor is being decoded and a third instruction is being fetched from memory. This arrangement is referred to as a three-stage execution pipeline.

In the part of the CPU 100 illustrated in FIG. 3, data processing instructions which have been fetched from memory and then decoded are passed for execution. The data processing instructions are 32-bit data words, of which bits 28 to 31 form a 4-bit condition field. The remaining bits (bits 0 to 27) define the operation to be performed in response to that instruction and, in some cases an operand on which the operation is to be performed.

The condition field (bits 28 to 31) is passed to a condition tester 200 which compares the bits of the condition field with 16 pre-defined condition codes. The 16 condition codes define the state of one or more of four processor flags 210, referred to as the N, Z, C and V flags. These flags represent a processing state of the CPU 100 generated by previously executed instructions.

The N flag denotes a negative result from the previous arithmetic operation of the CPU 100; the Z flag denotes a zero (equal) result from the previous CPU operation; the C flag denotes whether a carry bit was set during the previous CPU operation; and the V flag indicates an arithmetic overflow occurring during the previous CPU operation.

The relation between the four bits of the condition field and the conditions applied to the N, Z, C and V flags are shown in the list below:

0000=EQ—Z set (equal)
0001=NE—Z clear (not equal)
0010=Cs—C set (unsigned higher or same)
0011=CC—C clear (unsigned lower)
0100=MI—N set (negative)
0101=PL—N clear (positive or zero)

0110=VS—V set (overflow)
0111=VC—V clear (no overflow)
1000=HI—C set and Z clear (unsigned higher)
1001=LS—C clear or Z set (unsigned lower or same)
1010=GE—N set and V set, or N clear and V clear (greater or equal)
1011=LT—N set and V clear, or N clear and V set (less than)
1100=GT—Z clear, and either N set and V set, or N clear and V clear (greater than)
1101=LE—Z set, or N set and V clear, or N clear and V set (less than or equal)
1110=AL—always
1111=NV—never The condition tester 200 tests the state of the flags listed above, in dependence on which bits are set in the condition field of the current instruction. This comparison takes place during execution of the current instruction. The current instruction is allowed to complete its execution only if the appropriate flags are set to the states specified by the condition field.

If the always (AL) condition is specified, the instruction will be executed irrespective of the flags. The never (NV) condition code prevents execution of the instruction irrespective of the state of the flags 210.

The condition tester 200 generates an output signal 220 indicating whether the current instruction should be completely executed. The output signal 220 is combined with the abort signal supplied on the abort control line 150 from the MMU 110 to the CPU 100, using an OR-gate 230. The output of the OR-gate 230 is therefore set if either the condition tester 200 indicates that the current instruction should not be completely executed, or the abort signal is asserted by the MMU 110.

An instruction execution unit 240 receives bits 0 to 27 of each instruction, defining the operation to be performed and, in some cases, an operand on which the operation is to be performed. During execution of the current instruction (i.e. after the propagation and processing delays of the condition tester 200 and the OR-gate 230), the instruction execution unit 240 receives the output of the OR-gate 230 indicating whether the current instruction should be completely executed. If the output of the OR-gate 230 indicates that the current instruction should not be completely executed, the instruction is cancelled without changing the state of any registers or memory locations associated with the apparatus.

The condition tester 200 and the instruction execution unit 240 may be of the same form as the corresponding components of the previously proposed ARM 6 processor referred to above.

The result of using the apparatus of FIG. 3 is that the stringent timing of the abort signal is greatly relaxed, so that the abort signal relating to a memory access initiated by the preceding instruction may be set at a late stage during execution of each instruction.

If an abort signal is received as a result of a failed instruction fetch operation, then that instruction is simply discarded at a later stage in the three-stage instruction pipeline referred to above.

Data read operations are followed by a non-memory-accessing (internal) processor cycle, to allow time for the data which has been read from memory to be loaded into the appropriate processor register. Accordingly, if an abort signal is received as a result of a failed data read operation, the internal cycle following the read operation allows time for any data supplied from memory by the MMU 110 (which data may well be erroneous) to be ignored and not stored in the intended location (e.g. a processor register).

Figure 4:
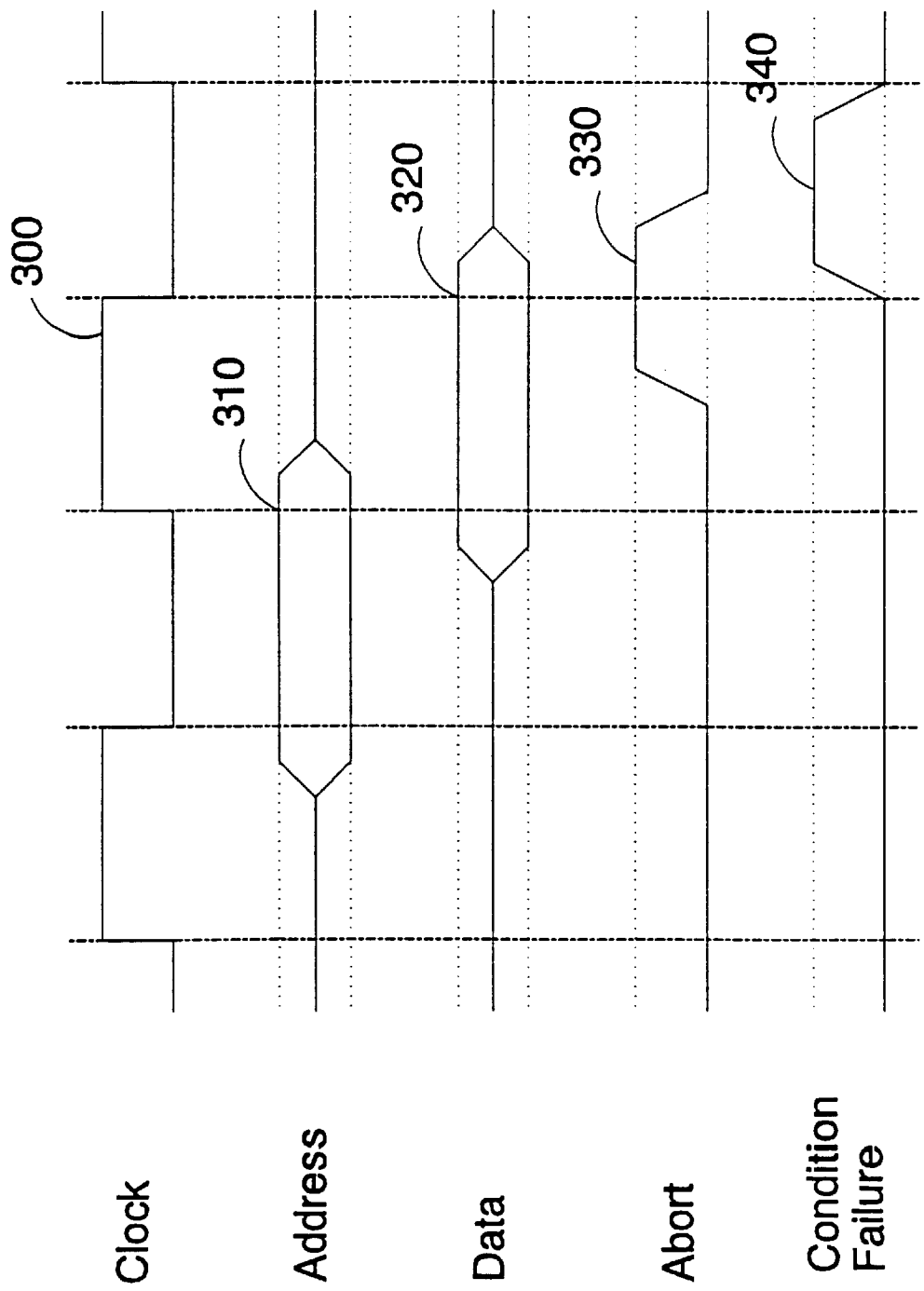
FIG. 4 is a schematic timing diagram illustrating the timing requirements of an abort signal during a data write operation by the data processing apparatus of FIG. 2.

The timing relationship of the instruction execution and the receipt of the abort signal for a data write operation is illustrated in FIG. 4, in which a clock signal 300 which controls instruction execution by the CPU 100 is illustrated along with the states of the address bus 130 and the data bus 140.

In order to initiate the data write operation an address 310 is placed on the address bus by the CPU 100. One half-cycle of the clock signal 300 later, data 320 are placed on the data bus 140 by the CPU 100. Once this has been done, the CPU 100 is able to execute the next instruction during the following cycle of the clock signal 300.

At the same time as the data 320 are placed on the data bus, if an abort signal is received (indicated in FIG. 4 as 330) or if the condition tester 200 determines that the next instruction should not be executed (which is determined by the condition tester 200 during the half-cycle after the data has been placed on the data bus and is indicated as 340), execution of the next instruction is abandoned.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

I claim:

1. A method of data processing in which successive data processing instructions are conditionally executed by an apparatus and the instructions are processed in synchronization with a clock cycle, said method comprising the steps of:

accessing a data memory in response to one or more of said instructions;

detecting whether each memory access is invalid wherein said detection occurs in a last half of the clock cycle of a first instruction;

detecting, during execution of each instruction, whether that instruction should be executed, in dependence on a processing state of said apparatus generated by previously executed instructions; and preventing execution of a second currently executing instruction if either a memory access is detected to be invalid or if the processing state of said apparatus generated by previously executed instructions indicates that the second currently executing instruction should not be executed.

2. Data processing apparatus which executes successive data processing instructions in a pipelined manner, and the instructions are processed in synchronization with a clock cycle, said apparatus comprising:

an execution unit for executing instructions to cause changes to data stored in registers and memory locations of said processor, said instructions including a first instruction and a second instruction;

a memory management unit for accessing said memory locations in response to certain of said instructions and for generating an abort signal to indicate that a memory access by said first instruction is invalid, wherein said abort control signal is generated in a last half of the clock cycle of a first instruction;

a condition tester for comparing condition codes in said second instruction with a plurality of flags indicating a processing state of said apparatus and generating a condition failure control signal if said codes do not match at least a first of said flags; and conditional control logic, responsive to said abort signal and to said condition failure control signal, for preventing said execution unit from changing, in response to said second instruction, data stored in registers and memory locations of said processor.

3. Data processing apparatus which executes successive data processing instructions in a pipelined manner, and the instructions are processed in synchronization with a clock cycle, said apparatus comprising:

a memory management unit which accesses a data memory in response to one or more of said instructions, said memory management unit comprising detection logic to detect whether each memory access is invalid, said memory management unit generating an abort control signal to indicate that a memory access is invalid, wherein said abort control signal is generated in a last half of the clock cycle of a first instruction;

a condition tester which responds to a processing state of said apparatus generated by previously executed instructions and which operates during execution of each instruction to detect whether that instruction should be executed, said condition tester generating a condition failure control signal to indicate that the current instruction should not be executed;

combining logic for combining said abort control signal and said condition failure control signal to generate a combined control signal; and conditional control logic which responds to said combined control signal to stop execution of a second currently executing instruction if either said memory management unit detects that a memory access initiated by a preceding instruction is invalid or if said condition tester detects that said second currently executing instruction should not be executed.

4. Data processing apparatus according to claim 3, further comprising:

at least one processing flag for storing data indicative of a current processing state of said data processing apparatus; and wherein each instruction includes a condition code defining a state of said processing flags required for that instruction to be executed; and said condition tester compares a required state of the processing flags defined by said condition code in each instruction with an actual state of said processing flags.

5. Data processing apparatus according to claim 4, further comprising four processing flags respectively denoting:

(i) whether a previous data processing operation of said apparatus generated a negative result (N);

(ii) whether a previous data processing operation of said apparatus generated a zero result (Z);

(iii) whether a carry bit was set by a previous data processing operation of said apparatus (C); and (iv) whether an arithmetic overflow occurred during a previous data processing operation of said apparatus (V).

6. Data processing apparatus according to claim 3, in which said memory management unit comprises:

means for transmitting a memory address to said data memory; and means for subsequently transmitting data to said data memory or receiving data from said data memory.

7. Data processing apparatus according to claim 3, in which said combining logic comprises a logical OR gate.

8. Data processing apparatus according to claim 7, in which data processing operations of the apparatus are controlled by a clock signal.

9. Data processing apparatus as set forth in claim 8 wherein said data processing apparatus is contained in an integrated circuit.

10. Data processing apparatus according to claim 4 in which said memory management unit comprises:

means for transmitting a memory address to said data memory; and means for subsequently transmitting data to said data memory or receiving data from said data memory.

11. Data processing apparatus according to claim 5 in which said memory management unit comprises:

means for transmitting a memory address to said data memory; and means for subsequently transmitting data to said data memory or receiving data from said data memory.

12. Data processing apparatus which executes successive data processing instructions in a pipelined manner, and the instructions are processed in synchronization with a clock cycle, said apparatus comprising:

a memory management unit which accesses a data memory in response to one or more of said instructions, said memory management unit comprising detection logic to detect whether each memory access is invalid, said memory management unit generating an abort control signal to indicate that a memory access by a previous instruction is invalid, wherein said abort control signal is generated in a last half of the clock cycle of a first instruction;

a condition tester which operates during execution of each instruction to detect whether that instruction should be executed, said condition tester generating a condition failure control signal to indicate that the current instruction should not be executed;

combining logic for combining said abort control signal and said condition failure control signal to generate a combined control signal having two states, wherein a first state is generated in response to receiving an abort control signal or a condition failure control signal, and a second state is generated otherwise; and conditional control logic which responds to said combined control signal to prevent complete execution of a current instruction in response to receiving a combined control signal having the first state and allowing execution of the current instruction in response to receiving a combined control signal having the second state.

* * * * *